US008953469B2

(12) United States Patent
Oike

(10) Patent No.: US 8,953,469 B2
(45) Date of Patent: Feb. 10, 2015

(54) COMMUNICATION DEVICE AND COMPUTER PROGRAM PRODUCT

(75) Inventor: Kenji Oike, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 673 days.

(21) Appl. No.: 13/221,191

(22) Filed: Aug. 30, 2011

(65) Prior Publication Data

US 2012/0050453 A1 Mar. 1, 2012

(30) Foreign Application Priority Data

Aug. 31, 2010 (JP) ................................. 2010-193606

(51) Int. Cl.
H04J 1/16 (2006.01)
H04N 7/14 (2006.01)

(52) U.S. Cl.
CPC .................................... *H04N 7/141* (2013.01)
USPC ......................................................... 370/252

(58) Field of Classification Search
CPC ..................................................... H04N 7/141
USPC ........................................... 370/252; 455/422
See application file for complete search history.

(56) References Cited

U.S. PATENT DOCUMENTS

| 6,516,192 B1 * | 2/2003 | Spaur et al. .................... 455/450 |
| 7,120,114 B1 * | 10/2006 | Miyamoto .................... 370/230 |
| 2008/0253281 A1 * | 10/2008 | Li et al. .......................... 370/218 |

FOREIGN PATENT DOCUMENTS

JP 2008-219812 A 9/2008

OTHER PUBLICATIONS

Tsugawa, Tomoaki, et. al., "Implementation and evaluation of an inline network measurement algorithm and its application technique," Technical Report of the Institute of Electronics, Information and Communication Engineers, (IN2005-120), Dec. 2005, pp. 79-84.
Cao Le Thanh Man, et al., "A study on Inline Network Measurement Mechanism for Service Overlay Networks," Technical Report of the Institute of Electronics, Information and Communication Engineers, Jan. 17, 2003, pp. 53-58, vol. 102, No. 565.
Cao Le Thanh Man, et. al., "Inline Bandwidth Measurement Techniques for Gigabit Networks," International Journal of Internet Protocol Technology (IJIPT) 2008, pp. 81-94, vol. 3, No. 2.

(Continued)

*Primary Examiner* — Wei Zhao
(74) *Attorney, Agent, or Firm* — Banner & Witcoff, Ltd.

(57) ABSTRACT

A communication device capable of connecting to a network includes a switching portion that switches an operation state of the communication device to one of a measurement state and a non-measurement state within a predetermined cycle, the measurement state being a state in which an available bandwidth is measured, the non-measurement state being a state in which the available bandwidth is not measured, and the available bandwidth being a bandwidth available in the network, a first transmission portion that transmits to a partner device a plurality of measurement packets while sequentially changing transmission intervals, in a state in which the operation state has been switched to the measurement state and a second transmission portion that transmits a data packet to the partner device, using a bandwidth smaller than the available bandwidth, in a state in which the operation state has been switched to the non-measurement state.

17 Claims, 12 Drawing Sheets

(56) References Cited

OTHER PUBLICATIONS

Tsugawa, Tomoaki et al. "Implementation and evaluation of an inline network measurement algorithm and its application technique." Technical Report of the Institute of Electronics, Information and Communication Engineers, (IN2005-120), Dec. 2005, pp. 61-66, English abstract.

Japanese Office Action mailed on Jun. 4, 2013 in corresponding Japanese Application No. 2010-193606, English translation.

* cited by examiner

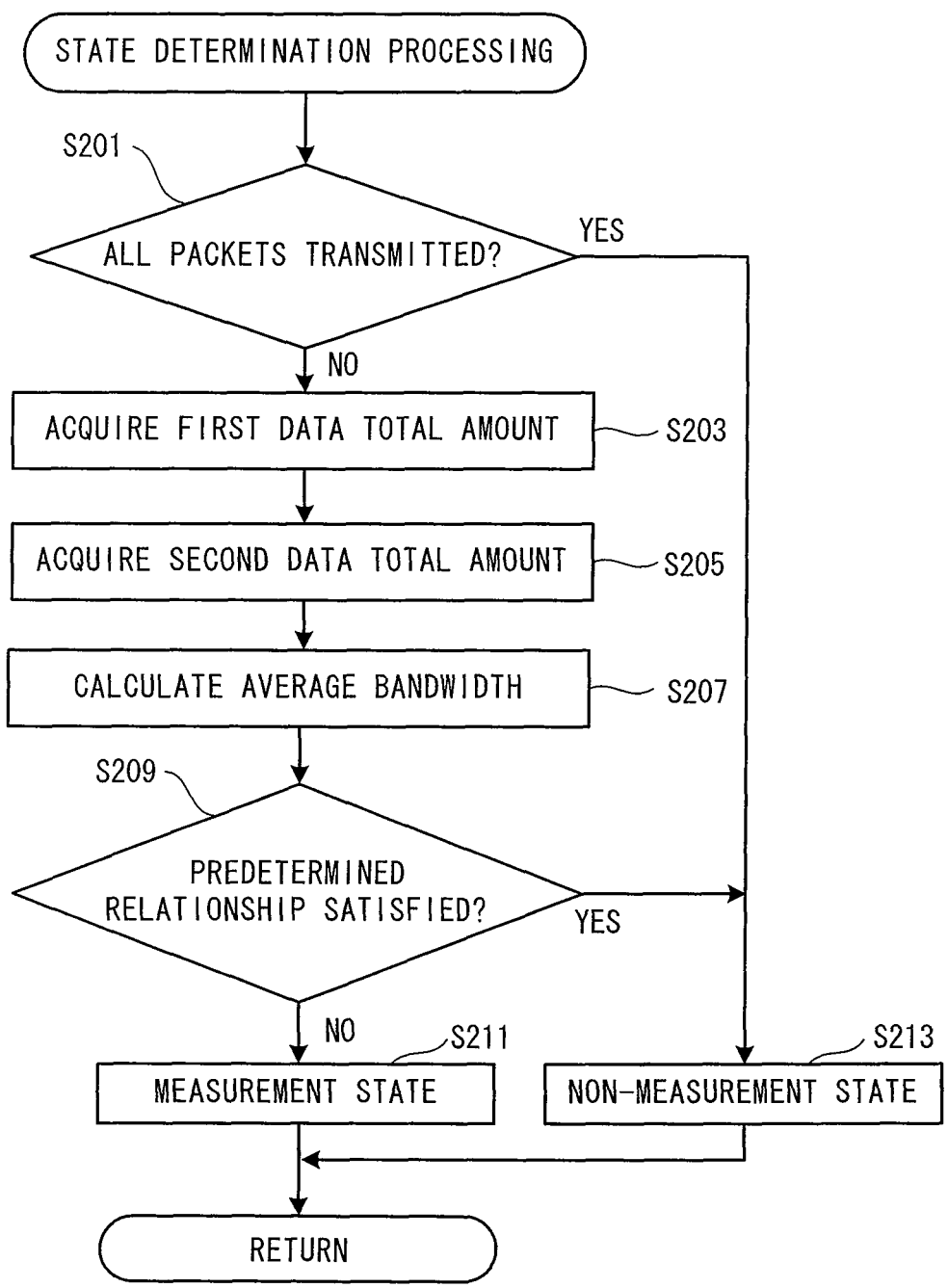

COMMUNICATION DEVICE AND COMPUTER PROGRAM PRODUCT

CROSS-REFERENCE TO RELATED APPLICATION

This application claims priority to Japanese Patent Application No. 2010-193606, filed Aug. 31, 2010, the content of which is hereby incorporated herein by reference in its entirety.

BACKGROUND

The present disclosure relates to a communication device and a computer program product. More specifically, the present disclosure relates to a communication device and a computer program product that are capable of measuring an available bandwidth of a communication path between communication devices.

Communication devices are known that can continuously measure the capacity of a transmission path that is available in a communication network (such as the Internet). Hereinafter, a "transmission rate" and the "transmission path capacity" are also referred to as a "bandwidth". The available transmission path capacity is referred to as an "available bandwidth". In the known communication devices, a transmission-side communication device (hereinafter referred to as a "transmission device") that transmits packets for measurement (hereinafter referred to as "measurement packets") stores, in each of the measurement packets, time information to be used to calculate a transmission interval of the measurement packets. The transmission device transmits the measurement packets, while gradually changing the transmission intervals of the measurement packets and thereby sequentially changing the bandwidths used for transmission within a range of a predetermined bandwidth (hereinafter referred to as a "bandwidth range"). A receiving-side communication device (hereinafter referred to as a "reception device") stores reception intervals of the measurement packets. The reception device calculates a difference between each of the transmission intervals included in the time information in the measurement packets and each of the reception intervals stored in the reception device. The available bandwidth is identified from the tendency of change in values of the calculated plurality of differences. The identified available bandwidth is notified to the transmission device. The transmission device acquires the available bandwidth. The above-described processing is repeatedly performed by the transmission device transmitting the measurement packets while changing the bandwidth range. By doing this, the bandwidth that is available between the communication devices is continuously measured. The bandwidth range is determined such that the available bandwidth identified at the previous measurement time is equal to an average value (a median value of the narrowest bandwidth and the widest bandwidth in the bandwidth range) in the bandwidth range at the current measurement time.

Data such as audio data and video data attributable to an application desired by a user (hereinafter referred to as "desired data") is stored in the measurement packets. Thus, the communication device can perform communication of the desired data between the communication devices, while measuring the available bandwidth of the communication path. It is therefore possible to efficiently perform communication of the desired data.

SUMMARY

There may be cases in which the user of the communication device wants to continuously perform communication of other desired data using the network where the available bandwidth is measured. Further, there may be cases in which the user of the communication device wants to perform communication of other desired data attributable to another application using the network. Further, there may be cases in which a user of another communication device wants to perform communication of other desired data using the network. However, with the known method, a most part of the available bandwidth in the network is occupied by communication of the measurement packets. For this reason, there may be no available bandwidth left in the network. Therefore, there may be cases in which the communication device and the other communication device cannot stably perform communication of the other desired data.

Various embodiments of the broad principles derived herein provide a communication device and a computer program product that are capable of stably performing communication of other desired data.

Embodiments provide a communication device that includes a switching portion that switches an operation state of the communication device to one of a measurement state and a non-measurement state within a predetermined cycle, the measurement state being a state in which an available bandwidth is measured, the non-measurement state being a state in which the available bandwidth is not measured, and the available bandwidth being a bandwidth available in the network, a first transmission portion that transmits to a partner device a plurality of measurement packets while sequentially changing transmission intervals, in a state in which the operation state has been switched to the measurement state by the switching portion, the partner device being another communication device that is connected to the network and a second transmission portion that transmits a data packet to the partner device, using a bandwidth smaller than the available bandwidth, in a state in which the operation state has been switched to the non-measurement state by the switching portion.

Embodiments also provide a non-transitory computer-readable medium storing a control program executable on a communication device. The program includes instructions that cause a computer of the communication device to perform the steps of switching an operation state of the communication device to one of a measurement state and a non-measurement state within a predetermined cycle, the measurement state being a state in which an available bandwidth is measured, the non-measurement state being a state in which the available bandwidth is not measured, and the available bandwidth being a bandwidth available in the network, transmitting to a partner device a plurality of measurement packets while sequentially changing transmission intervals, in a state in which the operation state has been switched to the measurement state, the partner device being another communication device that is connected to the network and transmitting a data packet to the partner device, using a bandwidth smaller than the available bandwidth, in a state in which the operation state has been switched to the non-measurement state.

BRIEF DESCRIPTION OF THE DRAWINGS

Embodiments will be described below in detail with reference to the accompanying drawings in which:

FIG. 12 is a flow chart showing state determination processing according to a modified embodiment.

DETAILED DESCRIPTION

Hereinafter, a communication device 1, which is an exemplary embodiment of a communication device of the present disclosure, and a communication system 100 including a plurality of the communication devices 1 will be described with reference to the drawings.

Figure 1:
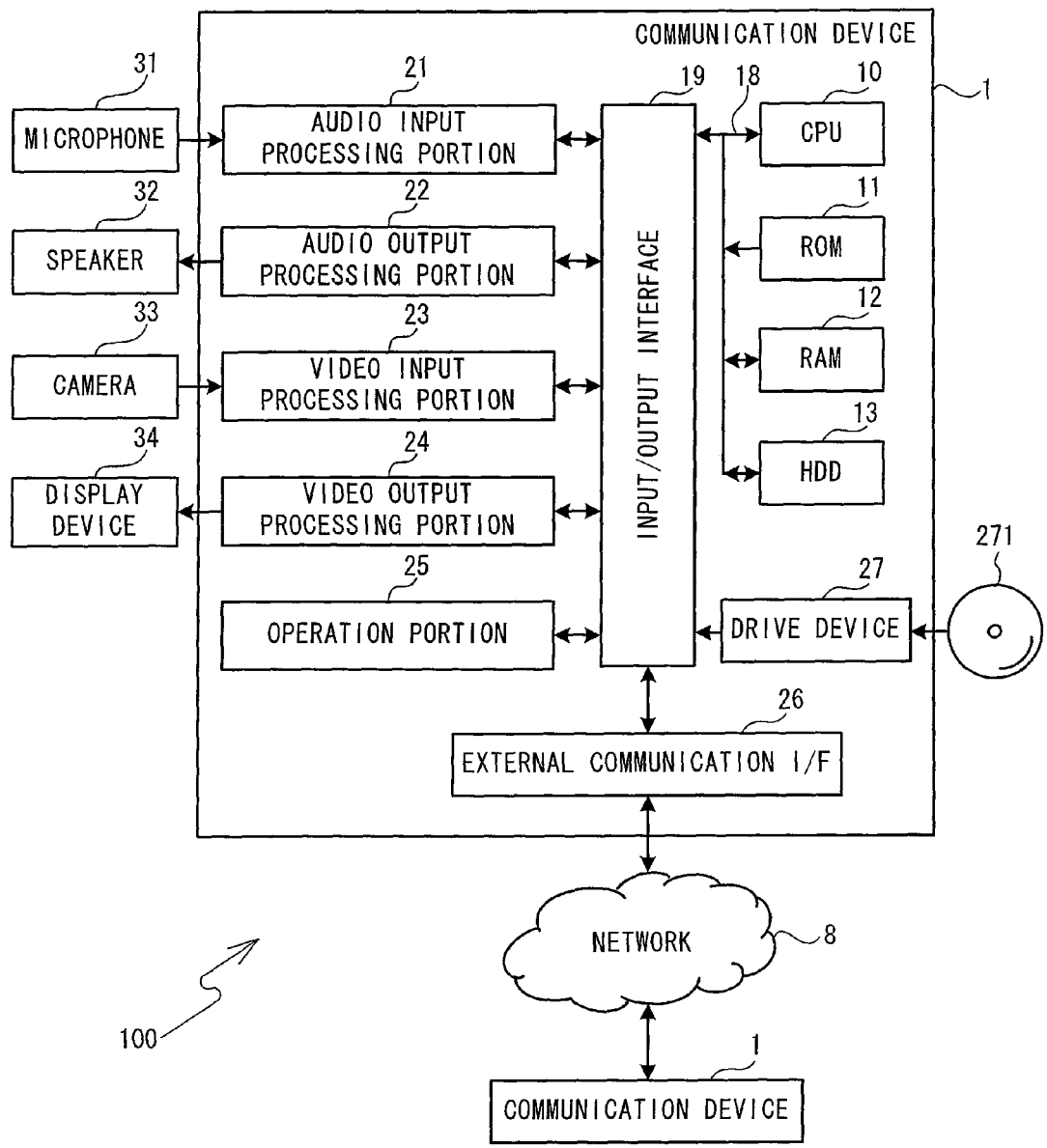
FIG. 1 is a diagram showing a configuration of a communication system and an electrical configuration of a communication device.

As shown in FIG. 1, the communication system 100 includes at least two of the communication devices 1. Each of the communication devices 1 capable of connecting to another of the communication devices 1 via a network 8. Each of the communication devices 1 performs communication of various types of data with the other communication device 1.

The communication system 100 is a video conference system for users at a plurality of bases to perform a video conference. Each of the communication devices 1 mutually transmits and receives video data, image data and audio data, and thereby shares video, documentation and audio of the plurality of bases. It is sufficient if the communication device 1 can perform data communication via the network 8. Specifically, the communication device 1 may be a dedicated video conference terminal that is provided at each of the bases to perform video conferences, or may be a personal computer that performs various types of information processing.

In the communication system 100, the bandwidth is measured between the communication device 1 and the other communication device 1 that is a communication partner, and an available bandwidth is identified. The available bandwidth is a maximum transmission rate at which the receiving-side communication device 1 can receive data at substantially the same transmission rate as the transmission rate of the data transmitted by the transmission-side communication device 1. If a packet is transmitted at a transmission rate that exceeds the available bandwidth, packet loss, a communication delay and the like occur. On the other hand, if the transmission rate is reduced too much, it is not possible to sufficiently use the available bandwidth and efficiency deteriorates. Accordingly, each of the communication devices 1 controls the transmission rate (bandwidth) to be used, in accordance with the identified available bandwidth. Note that, in order to compare the bandwidth and the transmission rate between the communication device 1 and the other communication device 1 that is the communication partner, "bps" is used as a bandwidth unit.

An electrical configuration of the communication device 1 will be described. As shown in FIG. 1, the communication device 1 includes a CPU 10 that controls the communication device 1. The CPU 10 incorporates an encoder. The encoder generates video data, image data and audio data. A ROM 11, a RAM 12, a hard disk drive (hereinafter referred to as an "HDD") 13 and an input/output interface 19 are connected to the CPU 10 via a bus 18.

The ROM 11 stores programs and initial values etc. to operate the communication device 1. The RAM 12 temporarily stores various types of information used by a control program. The HDD 13 is a non-volatile storage device that stores various types of information, such as the control program. A storage device, such as an EEPROM or a memory card, may be used in place of the HDD 13.

An audio input processing portion 21, an audio output processing portion 22, a video input processing portion 23, a video output processing portion 24, an operation portion 25, an external communication I/F 26 and a drive device 27 are connected to the input/output interface 19. The audio input processing portion 21 processes data input from a microphone 31. The audio output processing portion 22 processes operations of a speaker 32. The video input processing portion 23 processes data input from a camera 33. The video output processing portion 24 processes operations of a display device 34 that displays video. The operation portion 25 is used to input various types of commands to the communication device 1. The operation portion 25 may be a portion that is connected to the input/output interface 19 from the outside of the communication device 1. The external communication I/F 26 connects the communication device 1 to the network 8. The drive device 27 can read out information stored in a storage medium 271. For example, when the communication device 1 is set up, the drive device 27 reads out the control program stored in the storage medium 271. The read out control program is stored in the HDD 13.

A bandwidth measurement method used in the communication system 100 of the present embodiment will be schematically described. For example, "Cao Le Thanh Man, Go Hasegawa, Masayuki Murata, "A study on Inline Network Measurement Mechanisms for Service Overlay Networks" Technical Research Report of The Institute of Electronics, Information and Communication Engineers, Jan. 17, 2003, Vol. 102, No. 565, p. 53-58" discloses a bandwidth measurement method, the relevant portions of which are incorporated herein by reference. Note that, the bandwidth measurement method used in the communication system 100 is not limited to this method. Any measurement method that uses a packet transmission interval and a packet reception interval can be used.

The measurement principle will be described. The communication device 1 transmits a plurality of measurement packets to another of the communication devices 1 via the network 8. The other communication device 1 receives the measurement packets. Hereinafter, the communication device 1 that transmits the measurement packets is referred to as a "transmission device". The communication device 1 that receives the measurement packets is referred to as a "reception device". If the bandwidth (unit: bps) that is used when the transmission device transmits measurement packets is equal to or less than the available bandwidth (unit: bps), the measurement packets are not congested in the network 8. In this case, an interval (a reception interval) at which the reception device receives the measurement packets transmitted by the transmission device is theoretically the same as an interval (a transmission interval) at which the transmission device transmits the measurement packets. On the other hand, if the bandwidth that is used when the transmission device transmits measurement packets is larger than the available bandwidth, the measurement packets are congested in the network 8, and the reception interval becomes longer than the transmission interval.

The transmission device gradually changes the transmission intervals, and thereby changes the bandwidths used to transmit the measurement packets. In a time period during which the used bandwidth is larger than the available bandwidth, the reception interval is longer than the transmission interval. However, when the bandwidth used to transmit the measurement packets is equal to or less than the available bandwidth, the reception interval is the same as the transmission interval. The communication device 1 can identify, as the available bandwidth, the bandwidth that is used at a point in time at which a relationship between the reception interval and the transmission interval changes.

Measurement procedures will be described. In the communication system 100, the bandwidth is measured and the available bandwidth is identified by roughly the following procedures.

1. Transmission and Reception of Measurement Packets

A predetermined bandwidth range is identified by the transmission device. The bandwidth range is a range of a predetermined bandwidth that is defined by two different bandwidths. A plurality of bandwidths that are used when measurement packets are transmitted are selected from among the bandwidths within the identified predetermined bandwidth range. Hereinafter, the bandwidths that are used when measurement packets are transmitted are referred to as "measurement bandwidths". A data size and a transmission interval of each of the measurement packets that is transmitted using each of the measurement bandwidths are determined. The measurement packets are sequentially transmitted from the transmission device to the reception device at the determined transmission intervals. The transmission interval and the data size are stored in the measurement packets. The reception device receives the measurement packets.

2. Identification of Available Bandwidth

After receiving a series of measurement packets, the reception device calculates reception intervals based on the times at which the measurement packets were actually received. Based on the transmission interval and the size of each of the measurement packets, a transmission rate when each of the measurement packets was transmitted is calculated. Based on the reception interval and the size of each of the measurement packets, a reception rate when each of the measurement packets was received is calculated. Based on a relationship between the transmission rate (bps) when the measurement packet was transmitted and the reception rate (bps) when the measurement packet was received, a value of "transmission interval/reception interval" is calculated. A point in time at which the value of "transmission interval/reception interval" changes is identified. The transmission rate at the identified point in time is identified as the available bandwidth. The identified available bandwidth is stored in a result packet. The result packet is transmitted from the reception device to the transmission device. The transmission device receives the result packet.

3. Updating Bandwidth Range and Returning to Measurement Procedure Described in Section 1 Above The transmission device identifies a new bandwidth range based on the available bandwidth included in the received result packet. Specifically, the transmission device identifies the new bandwidth range such that an average in the new bandwidth range matches the available bandwidth. The bandwidth is repeatedly measured based on the identified new bandwidth range. By doing this, identification of the available bandwidth is repeated. Hereinafter, a series of communication that is performed to identify the available bandwidth is referred to as "measurement communication".

Desired data to perform a video conference is stored in the measurement packets. The transmission device can transmit the desired data to the reception device at the same time as the measurement communication. Thus, the communication device 1 can perform the video conference while measuring the available bandwidth by performing the measurement communication.

Figure 2:
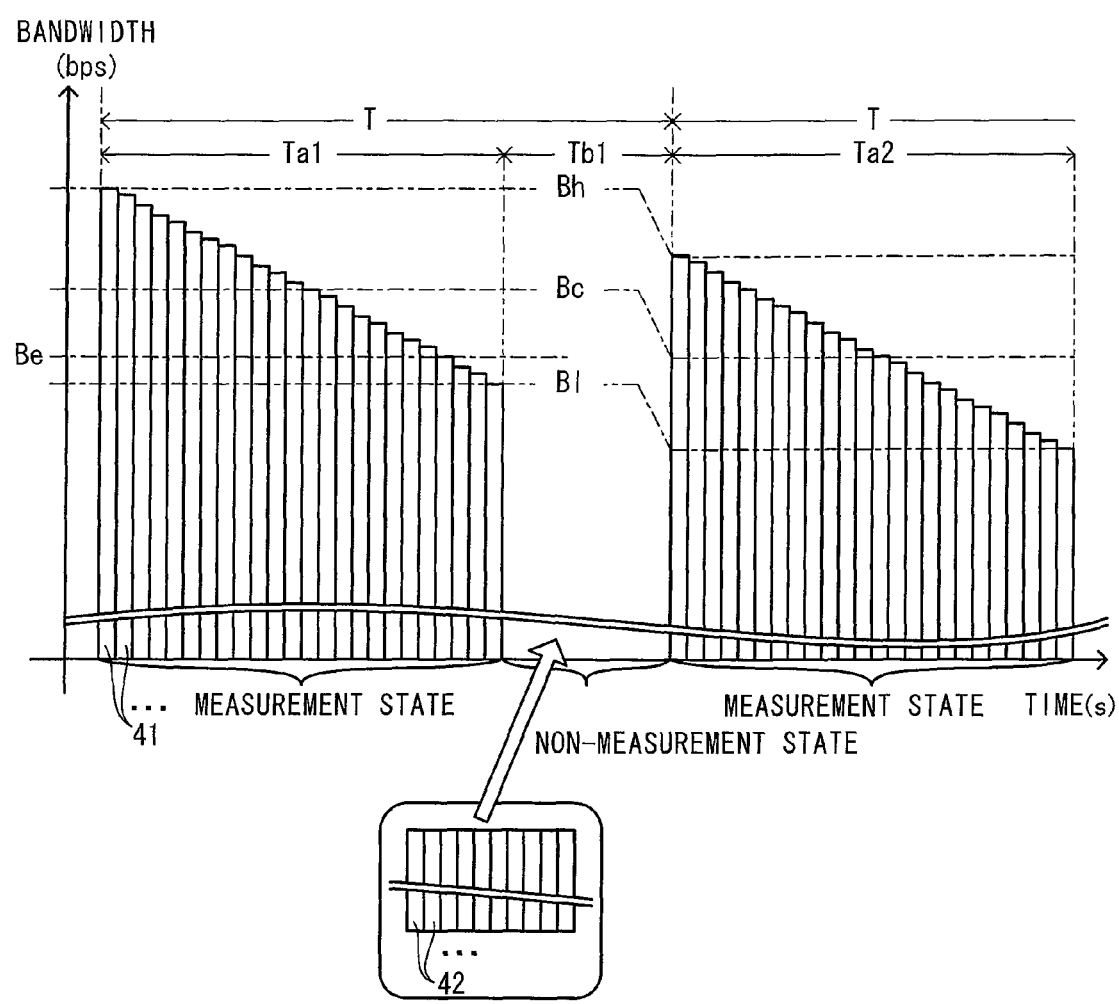
FIG. 2 is a diagram showing a first example of a procedure in which measurement packets are transmitted in measurement communication.

With reference to FIG. 2, a first example of the procedures in which measurement packets are transmitted in the measurement communication will be described. Rectangular bars 41 indicate the measurement packets that are transmitted from the transmission device. The bar length indicates the measurement bandwidth used to transmit each of the measurement packets. A range from a bandwidth Bl to a bandwidth Bh indicates a bandwidth range. The bandwidth Bl indicates the narrowest bandwidth within the bandwidth range. The bandwidth Bh indicates the widest bandwidth within the bandwidth range. The transmission device gradually increases the transmission intervals of the measurement packets, and thereby sequentially changes the measurement bandwidth from the wide bandwidth side to the narrow bandwidth side. The series of measurement packets corresponding to the bandwidth range are transmitted during a time period Ta1 and a time period Ta2, respectively. An available bandwidth Be is identified by the measurement communication during the time period Ta1. The bandwidth range in the measurement communication performed during the time period Ta2 is adjusted so that the available bandwidth Be is equal to an average in the bandwidth range. Note that, in FIG. 2, spaces between the adjacent bars, each of which corresponds to the transmission interval between the successive measurement packets, are omitted.

As shown in FIG. 2, in the first example, a time period Tb1 is provided between the end of the measurement communication during the time period Ta1 and the start of the measurement communication during the time period Ta2. The measurement communication during the time period Ta1 and the measurement communication during the time period Ta2 are not performed continuously. During the time period Tb1, for example, among various types of data stored in the measurement packets, only data requiring real time characteristics is stored in packets and communication is performed. Alternatively, for example, data that is based on an application other than an application that measures the available bandwidth is stored in the packets and communication is performed. Rectangular bars 42 indicate the packets that are transmitted during the time period Tb1. Hereinafter, an operation state (corresponding to a state during the time period Ta1 or the like) in which the measurement communication is performed is referred to as a "measurement state". An operation state (corresponding to a state during the time period Tb1 or the like) in which the measurement communication is not performed is referred to as a "non-measurement state". The packets used to perform communication in the non-measurement state are referred to as "data packets". A cycle (corresponding to T) in which the series of measurement packets and the data packets are transmitted is hereinafter referred to as a "measurement cycle". In this manner, by providing the non-measurement state between the measurement communication and the next measurement communication, the communication device 1 can secure a bandwidth that is necessary to perform communication of the data packets. The communication device 1 can effectively use the bandwidth that is secured by providing the non-measurement state, and thereby performs communication of packets other than the measurement packets.

In the present embodiment, if one of the following conditions (1) and (2) is satisfied, the operation state of the communication device 1 may be switched from the measurement state to the non-measurement state.

(1) All of the series of measurement packets corresponding to the bandwidth range have been transmitted.

(2) The measurement state has been continued for a predetermined time period (100 ms, for example) or more.

If the condition (2) is satisfied, the operation state is switched from the measurement state to the non-measurement state. Therefore, a time period in the measurement state can be reliably secured. Thus, the bandwidth that is necessary to measure the available bandwidth using the measurement packets can be secured.

Further, if the following condition (3) is satisfied, the operation state of the communication device 1 may be switched from the non-measurement state to the measurement state.

(3) The ratio of the time period during which the non-measurement state has been continued is a predetermined ratio (70 percent, for example) or more with respect to the time period during which the measurement state has been continued.

If the condition (3) is satisfied, the operation state is switched from the non-measurement state to the measurement state. Therefore, the bandwidth necessary to measure the available bandwidth and the bandwidth necessary to perform communication of the data packets can be secured. Since the time ratio between the measurement state and the non-measurement state can be optimized, the bandwidth necessary to perform communication using the data packets can be appropriately allocated.

Further, if the following condition (4) is satisfied, the measurement cycle may end and switch to the next measurement cycle.

(4) The result packet has been received from the reception device, and also the ratio of an accumulated time in the non-measurement state within the measurement cycle has become a predetermined ratio or more with respect to an accumulated time in the measurement state within the measurement cycle.

In FIG. 2, all of the series of measurement packets corresponding to the bandwidth range Bl to Bh are transmitted, and as a result, the operation state of the communication device 1 is switched from the measurement state to the non-measurement state (from the time period Ta1 to the time period Tb1). Further, the time period (the time period Tb1) during which the non-measurement state is continued is equal to or more than the predetermined ratio of the time period during which the measurement state is continued (the time period Ta1), and as a result, the operation state of the communication device 1 is switched from the non-measurement state to the measurement state (from the time period Tb1 to the time period Ta2). Further, the result packet is received from the reception device, and the accumulated time (the time period Tb1) in the non-measurement state within the measurement cycle (T) is equal to or more than the predetermined ratio of the accumulated time (the time period Ta1) in the measurement state within the measurement cycle (T). As a result, the measurement period (T) is switched to the next measurement period (T).

The bandwidth that is used when the data packets (corresponding to the bars 42) are transmitted in the non-measurement state may be determined to be smaller than the available bandwidth that was measured in the past. In FIG. 2, a bandwidth that is smaller than a median value Bc in the bandwidth range of the time period Ta1 is determined as the bandwidth that is used when the data packets are transmitted during the time period Tb1. Note that the median value Bc in the bandwidth range (Bl to Bh) of the time period Ta1 corresponds to the available bandwidth that was measured before the time period Ta1. Therefore, the bandwidth that is used when the data packets are transmitted during the time period Tb1 is smaller than the available bandwidth that was measured in the past. Since the bandwidth is determined in this manner, transmission of the data packets can be stably performed.

Note that the bandwidth that is used when the data packets are transmitted in the non-measurement state may be determined using another method. For example, the bandwidth may be determined to be equal to or less than a predetermined ratio (80 percent, for example) of the available bandwidth identified at the time of the measurement communication. For example, in FIG. 2, since the available bandwidth Be has been identified by the measurement communication during the time period Ta1, the bandwidth that is used when the data packets are thereafter transmitted may be determined to be equal to or less than the predetermined ratio of the available bandwidth Be. By doing this, the communication device 1 can further increase reliability of communication of the data packets in the non-measurement state. Note that, in the non-measurement bandwidth, the data packets need not necessarily be transmitted. If there is no data to be transmitted to the reception device, the data packets need not be transmitted.

Figure 3:
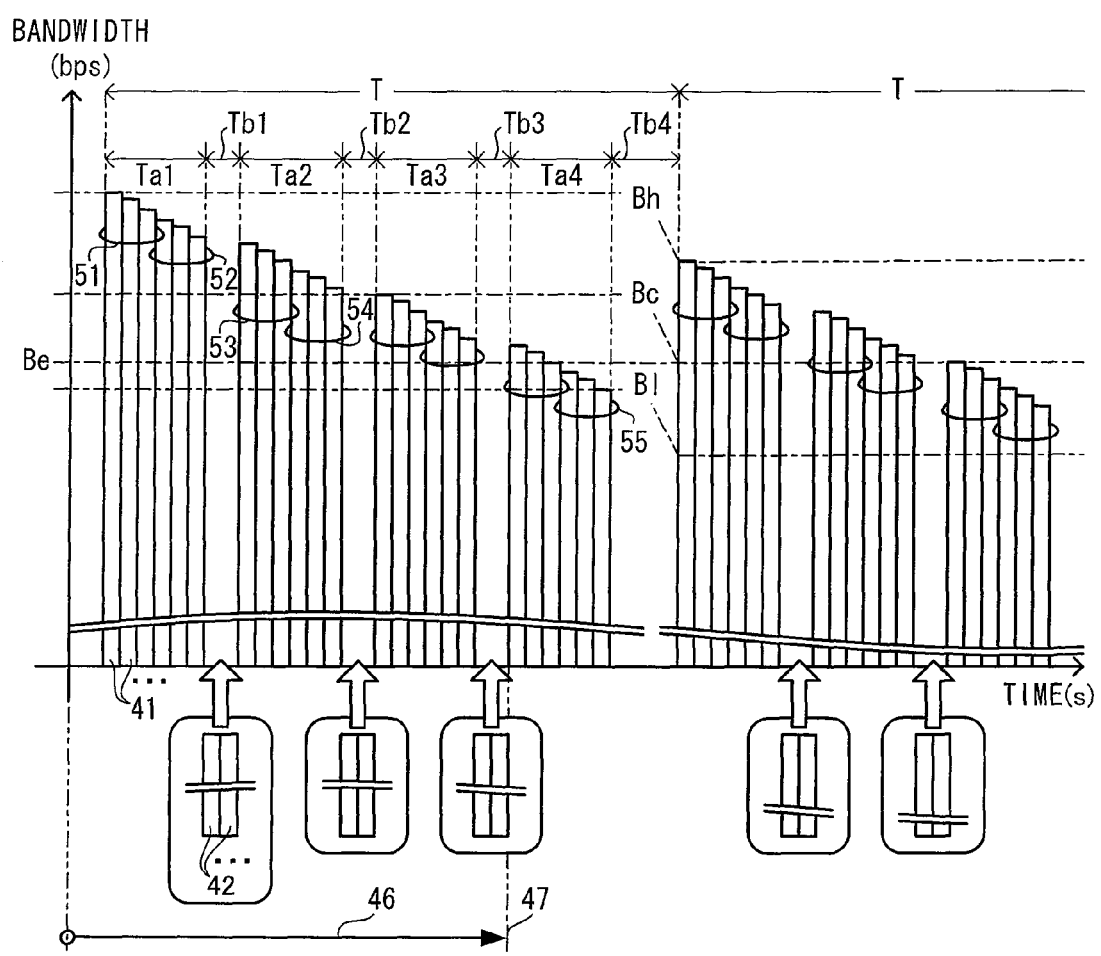
FIG. 3 is a diagram showing a second example of the procedure in which the measurement packets are transmitted in the measurement communication.

With reference to FIG. 3, a second example of the procedure in which the measurement packets are transmitted in the measurement communication will be described. In the second example, the communication device 1 divides the measurement packets into each group of a first total number. The first total number is a number that is smaller than a second total number. The second total number is a total of a series of measurement packets that are transmitted corresponding to the bandwidth range. Hereinafter, a group of measurement packets that are divided into the first total number is referred to as a "measurement packet group". In the second example, one measurement packet group includes three measurement packets. In the second example, the communication device 1 determines whether one of the above-described operation state switching conditions (1) and (2) is satisfied every time transmission of all the measurement packets that form one measurement packet group ends.

In FIG. 3, measurement packets that form measurement packet groups 51 and 52 are transmitted by the measurement communication during the time period Ta1. Measurement packets that form measurement packet groups 53 and 54 are transmitted by the measurement communication during the time period Ta2. The time period Tb1 is provided between the end of the measurement communication during the time period Ta1 and the start of the measurement communication during the time period Ta2. In a similar manner, a time period Tb2 is provided between the time period Ta2 and a time period Ta3, and a time period Tb3 is provided between the time period Ta3 and a time period Ta4. Communication of the data packets (corresponding to the bars 42) is performed during the time periods Tb1, Tb2 and Tb3. In this way, the communication device 1 may transmit the measurement packets in units of the measurement packet groups, and thereby increases frequency of switching to the non-measurement state so that the data packets can be transmitted frequently. By doing this, the communication device 1 can transmit the data packets frequently, and thereby reduces data communication delays.

In FIG. 3, after all the measurement packets that form the measurement packet group 52 have been transmitted, it is determined that the time period (the time period Ta1) during which the measurement state is continued is equal to or more than a predetermined time period, and the operation state is switched from the measurement state to the non-measurement state (from the time period Ta1 to the time period Tb1). Further, it is determined that the ratio of the time period (the time period Tb1) during which the non-measurement state is continued is equal to or more than a predetermined ratio of the time period (the time period Ta1) during which the measurement state is continued, and the operation state is switched from the non-measurement state to the measurement state (from the time period Tb1 to the time period Ta2). Similar processing is also performed for the time periods Ta2, Ta3, Ta4, Tb2 and Tb3. When measurement packets that form a measurement packet group 55 are all transmitted, it is determined that all of the measurement packets corresponding to the bandwidth range Bl to Bh have been transmitted, and the operation state of the communication device 1 is switched from the measurement state to the non-measurement state (from the time period Ta4 to a time period Tb4). Further, the result packet is received from the reception device, and the accumulated time period (Tb1+Tb2+Tb3+Tb4) in the non-measurement state within the measurement cycle (T) is equal to or more than the predetermined ratio of the accumulated time period (Ta1+Ta2+Ta3+Ta4) in the measurement state within the measurement cycle (T). As a result, the measurement period (T) is switched to the next measurement period (T).

As described above, the communication device 1 can secure the bandwidth necessary to perform data packet communication, by providing the non-measurement state in addition to the measurement state. The communication device 1 can secure the bandwidth that is necessary to measure the available bandwidth using the measurement packets, by securing a certain amount of time in the measurement state. When the time period in the measurement state is equal to or more than the predetermined time period, the operation state is switched to the non-measurement state. Thus, the communication device 1 can regularly secure the bandwidth that is necessary to perform data packet communication. The communication device 1 identifies the time ratio between the measurement state and the non-measurement state, and thereby adjusts the bandwidth that is necessary to measure the available bandwidth and the bandwidth that is necessary to perform data packet communication.

Main processing, transmission processing and reception processing performed by the CPU 10 of the transmission device will be described with reference to FIG. 4 to FIG. 11. When an activation operation for the application that measures the available bandwidth is performed via the operation portion 25, an application for the main processing stored in the HDD 13 is activated by the CPU 10 and the main processing is performed according to the application for the main processing. When a transmission flag stored in the RAM 12 is switched from OFF to ON, a transmission processing program stored in the HDD 13 is activated and the transmission processing is performed. When a reception flag stored in the RAM 12 is switched from OFF to ON, a reception processing program stored in the HDD 13 is activated and the reception processing is performed. ON/OFF of the transmission flag and the reception flag is switched during the main processing. The transmission flag and the reception flag are OFF when the main processing is activated. The processing performed by the CPU 10 is switched by an operation system (OS). Thus, the respective processes are performed in parallel. Note that, in the following description, a case is assumed in which the measurement packets are transmitted in units of the measurement packet groups based on the above-described second example (refer to FIG. 3). Further, one of video data, image data and audio data is stored in the measurement packets and the data packets.

The CPU 10 manages first parameters and second parameters. The first parameters are parameters that are used to transmit the measurement packets at predetermined transmission intervals every measurement cycle. The first parameters include a sequence number, a bandwidth range, transmission intervals, a first total number, a second total number and a data generation speed. The sequence number is a sequence number that is assigned to each of the measurement packets when the measurement packets are transmitted. The transmission interval is a transmission interval between the measurement packet and the next measurement packet. The transmission interval is identified for each of the measurement packets. The first total number is a total number of the measurement packets that form one measurement packet group. The second total number is a total of the series of measurement packets used to measure the bandwidth range, and transmitted within the measurement cycle. When the series of measurement packets are not divided into a plurality of packet groups as in the first example shown in FIG. 2, the first total number and the second total number have the same value. When the series of measurement packets are divided into a plurality of packet groups as in the second example shown in FIG. 3, the value of the first total number is smaller than that of the second total number. The data generation speed is a generation speed when video data, image data and audio data are generated by the encoder incorporated in the CPU 10.

Among the first parameters, the bandwidth range that is measured by each of the measurement packet groups may be determined instead of the first total number. The first total number may be determined based on the bandwidth range. As long as the value of a sum of the first total numbers is the same as the value of the second total number, the first total numbers of the respective measurement packet groups may have different values.

The second parameters include a measurement time, a non-measurement time, a continuous measurement time, a continuous non-measurement time, a first data total amount and a second data total amount. The measurement time is an accumulated time in the measurement state within the measurement cycle. The non-measurement time is an accumulated time in the non-measurement state within the measurement cycle. The continuous measurement time is a continuous time when the measurement state has been continued. The continuous non-measurement time is a continuous time when the non-measurement state has been continued. For example, when processing is performed in a range indicated by an arrow 46 shown in FIG. 3 and the processing time reaches a time point indicated by a dotted line 47, the measurement time corresponds to the time period Ta1+Ta2+Ta3. The non-measurement time corresponds to the time period Tb1+Tb2+Tb3. The continuous measurement time corresponds to the time period Ta3. The continuous non-measurement time corresponds to the time period Tb3. The first data total amount is a total amount of data stored in the measurement packets within the measurement cycle T. The second data total amount is a total amount of data stored in the data packets within the measurement cycle T.

Figure 4:
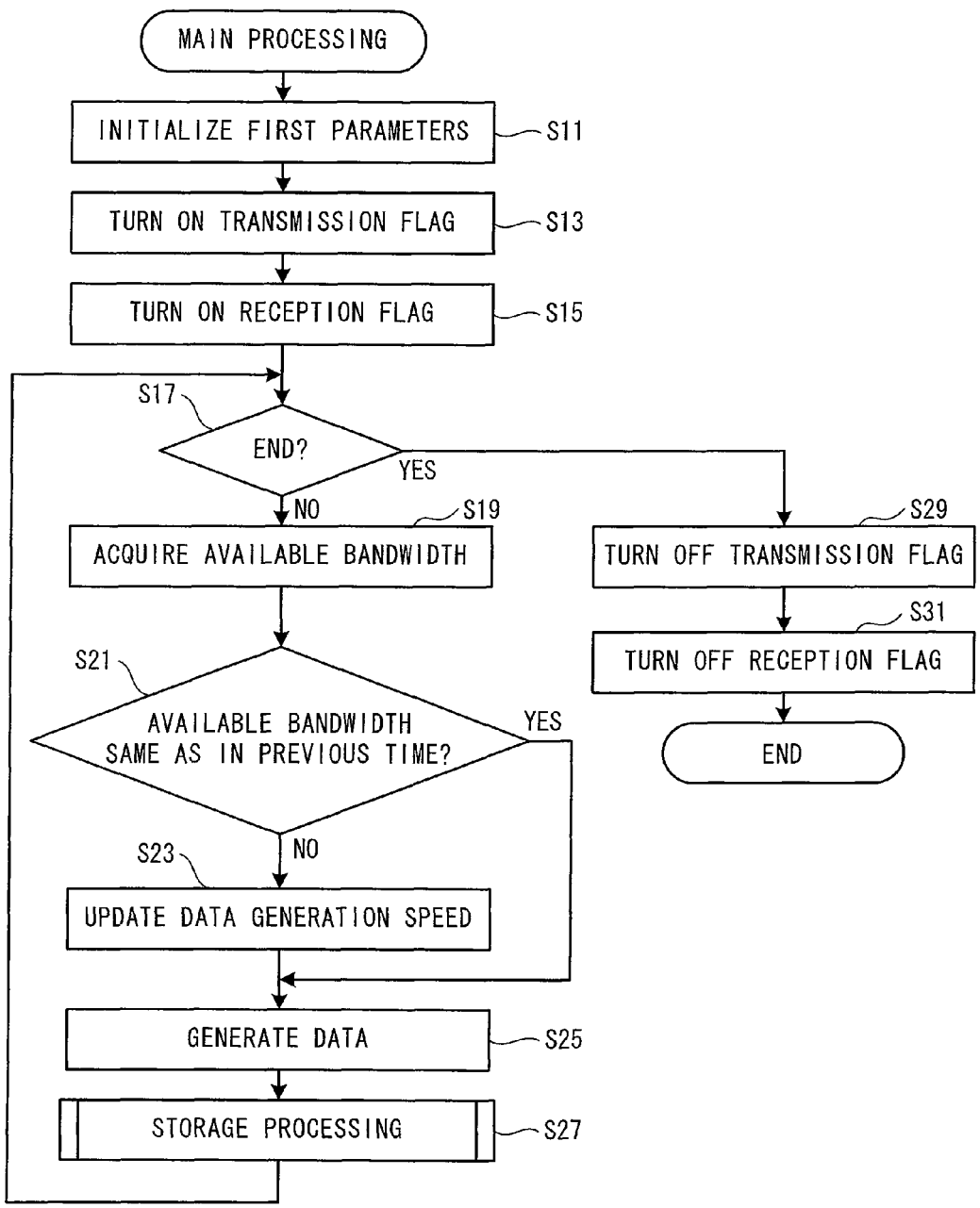
FIG. 4 is a flow chart showing main processing.
Figure 5:
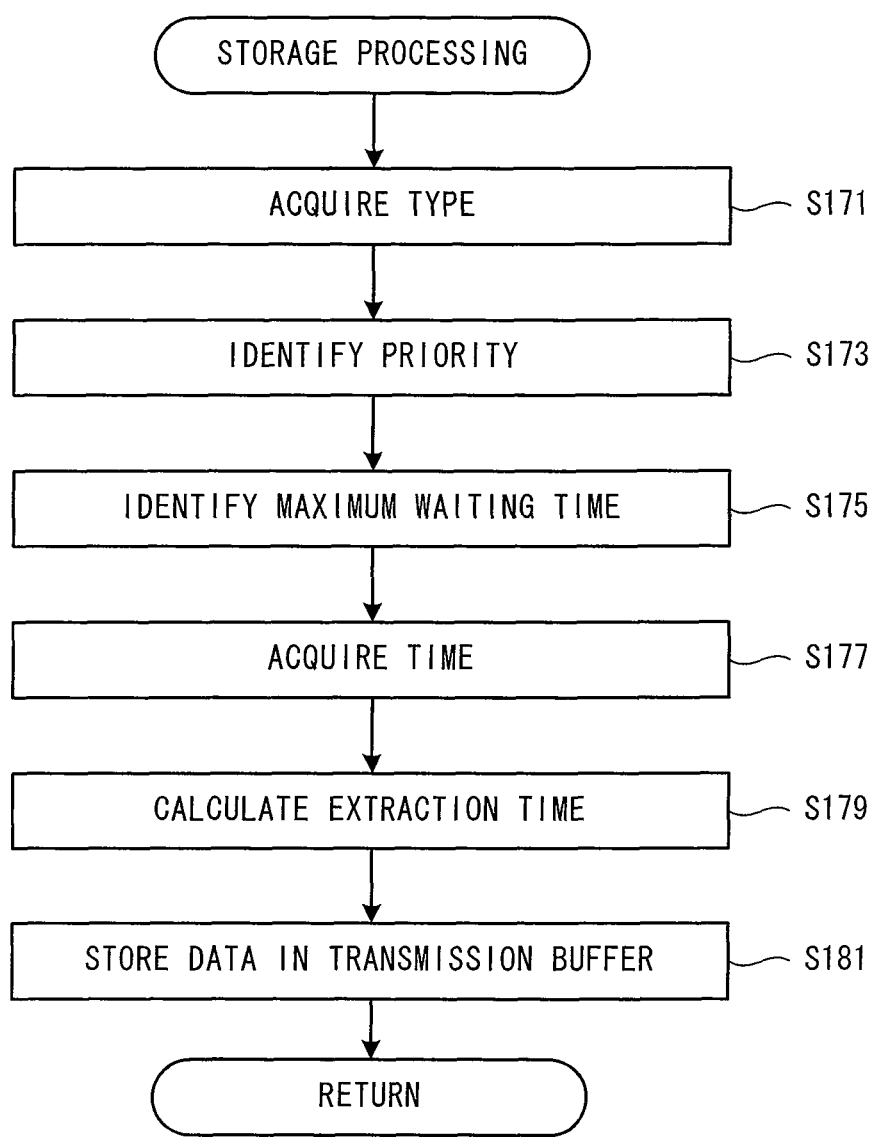
FIG. 5 is a flow chart showing storage processing.

The main processing will be described with reference to FIG. 4. In the main processing, first, the first parameters are initialized (step S11). The sequence number is set to "0". The bandwidth range, the transmission intervals, the first total number, the second total number and the data generation speed are set to the initial values stored in the ROM 11.

In order to permit activation of the transmission processing (refer to FIG. 6), the transmission flag is turned ON (step S13). In response to this, the transmission processing is activated. In order to permit activation of the reception processing (refer to FIG. 11), the reception flag is turned ON (step S15). In response to this, the reception processing is activated. Next, it is determined whether an end operation of the application that measures the available bandwidth has been performed via the operation portion 25 (step S17). If the end operation of the application has been performed (yes at step S17), the transmission flag that was turned ON at step S13 is turned OFF (step S29). The reception flag that was turned ON at step S15 is turned OFF (step S31). After the transmission flag and the reception flag are turned OFF, the main processing ends.

If the end operation of the application has not been performed (no at step S17), the available bandwidth stored in the HDD 13 is acquired (step S19). The available bandwidth is identified in the reception processing (refer to FIG. 11). It is determined whether the available bandwidth acquired the previous time is the same as the available bandwidth acquired this time (step S21). If the available bandwidth acquired the previous time is the same as the available bandwidth acquired this time (yes at step S21), the processing proceeds to step S25.

If the available bandwidth acquired the previous time is different from the available bandwidth acquired this time (no at step S21), the data generation speed is updated (step S23) based on the available bandwidth acquired at step S19. The data generation speed may be determined such that the value of the bandwidth to be used is smaller than that of the available bandwidth acquired at step S19. For example, the data generation speed may be determined such that the bandwidth to be used is 80 percent of the available bandwidth. As a result, it is possible to inhibit a situation in which the data generated by the encoder is not transmitted and is accumulated in the communication device 1. After step S23, the processing proceeds to step S25.

Based on the updated data generation speed, one of video data, image data and audio data is generated by the encoder (step S25). Next, the generated data is stored in a transmission buffer by storage processing (step S27). The storage processing will be described with reference to FIG. 5. A type of the data (one of the video data, the image data and the audio data) generated by the encoder is acquired (step S171). A priority of the generated data is identified based on the acquired type (step S173). As compared to the video data and the image data, the audio data requires a higher real time characteristic, and audio data communication needs to be performed in an environment with a smaller communication delay. Based on these necessities, the priority is identified such that the priority of the audio data is higher than that of the video data and the image data. The identified priority is associated with the generated data.

After the priority of the generated data is identified, a maximum waiting time is identified (step S175). The maximum waiting time is the maximum permissible time between the data generation by the encoder and the transmission of the generated data to the reception device after the generated data is stored in a measurement packet or a data packet. The maximum waiting time may be identified by the type of the generated data, specifications (such as a compression method) used when the generated data is encoded, and the like. For example, when the generated data is the video data, 66 ms may be identified as the maximum waiting time. When the generated data is the image data, 200 ms may be identified as the maximum waiting time. When the generated data is the audio data, 40 ms may be identified as the maximum waiting time. After the maximum waiting time is identified, a current time is acquired (step S177). An extraction time is calculated by adding the maximum waiting time identified at step S175 to the acquired current time (step S179). The calculated extraction time is associated with the generated data.

The transmission buffers are provided corresponding to the respective priorities. Each of the transmission buffers is used when a measurement packet or a data packet is transmitted to the reception device in the transmission processing (refer to FIG. 6). The generated data is stored in the transmission buffer corresponding to the associated priority (step S181). The storage processing ends and the processing returns to the main processing (refer to FIG. 4). In the main processing, after the storage processing (step S27) ends, the processing returns to step S17.

The transmission processing will be described with reference to FIG. 6 to FIG. 10. It is determined whether the transmission flag has been switched from ON to OFF (step S41). If the transmission flag has been turned OFF in the main processing (no at step S41), the transmission processing ends. When the transmission flag has been turned ON (yes at step S41), end determination processing is performed (step S43). In the end determination processing, it is determined whether the measurement cycle has been completed.

The end determination processing will be described with reference to FIG. 7. It is determined whether all of the series of measurement packets that measure the bandwidth range have been transmitted and the result packet has been received from the reception device (step S91). If the result packet has not been received (no at step S91), it is determined that the measurement cycle has not been completed (step S97). If the result packet has been received from the reception device (yes at step S91), it is determined whether the ratio of the non-measurement time to the measurement time is equal to or more than a predetermined ratio (30 percent, for example) (step S93). If the ratio of the non-measurement time to the measurement time is less than the predetermined ratio (no at step S93), it is determined that the measurement cycle has not been completed (step S97). If the ratio of the non-measurement time to the measurement time is equal to or more than the predetermined ratio (yes at step S93), it is determined that the measurement cycle has been completed (step S95). After step S95 or step S97, the end determination processing ends and the processing returns to the transmission processing (refer to FIG. 6).

If it is determined in the end determination processing (step S43) that the measurement cycle has been completed (yes at step S45), the second parameters are initialized in order to start the measurement communication in the next measurement cycle (step S47). After step S47, the processing proceeds to step S49. On the other hand, if it is determined in the end determination processing that the measurement cycle has not been completed (no at step S45), the processing proceeds to step S49.

At step S49, state determination processing is performed. In the state determination processing, the operation state is determined based on the second parameters. The state determination processing will be described with reference to FIG. 8. First, it is determined whether all of the series of measurement packets that measure the bandwidth range have been transmitted (step S101). The determination as to whether all of the series of measurement packets have been transmitted may be made by comparing the sequence number assigned to the last transmitted measurement packet with the second total number. If all of the series of measurement packets have been transmitted (yes at step S101), it is determined that the operation state is the non-measurement state (step S109). The state determination processing ends and the processing returns to the transmission processing (refer to FIG. 6).

If not all of the series of measurement packets have been transmitted (no at step S101), it is determined whether the continuous measurement time is equal to or more than a predetermined time period (step S103). If the continuous measurement time is equal to or more than the predetermined time period (yes at step S103), it means that the time period in the measurement state is sufficiently secured. Therefore, it is determined that the operation state is the non-measurement state (step S109). Since the time period in the measurement state is secured in this manner, the communication device 1 can secure the bandwidth that is necessary to measure the available bandwidth using the measurement packets. The communication device 1 can measure the available bandwidth reliably and accurately.

On the other hand, if the continuous measurement time is less than the predetermined time period (no at step S103), it is then determined whether the ratio of the continuous non-measurement time to the continuous measurement time is equal to or more than a predetermined ratio (step S105). If the ratio of the continuous non-measurement time to the continuous measurement time is less than the predetermined ratio (no at step S105), the time in the non-measurement state is not sufficiently secured. Therefore, it is determined that the operation state is the non-measurement state (step S109). If the ratio of the continuous non-measurement time is equal to or more than the predetermined ratio (yes at step S105), it means that the time in the non-measurement state is sufficiently secured. Therefore, it is determined that the operation state is the measurement state (step S107). After step S107 or step S109, the state determination processing ends and the processing returns to the transmission processing (refer to FIG. 6). Since the time ratio between the measurement state and the non-measurement state is identified in this manner, the bandwidth that is necessary to measure the available bandwidth and the bandwidth that is necessary to perform data packet communication can be secured.

Figure 6:
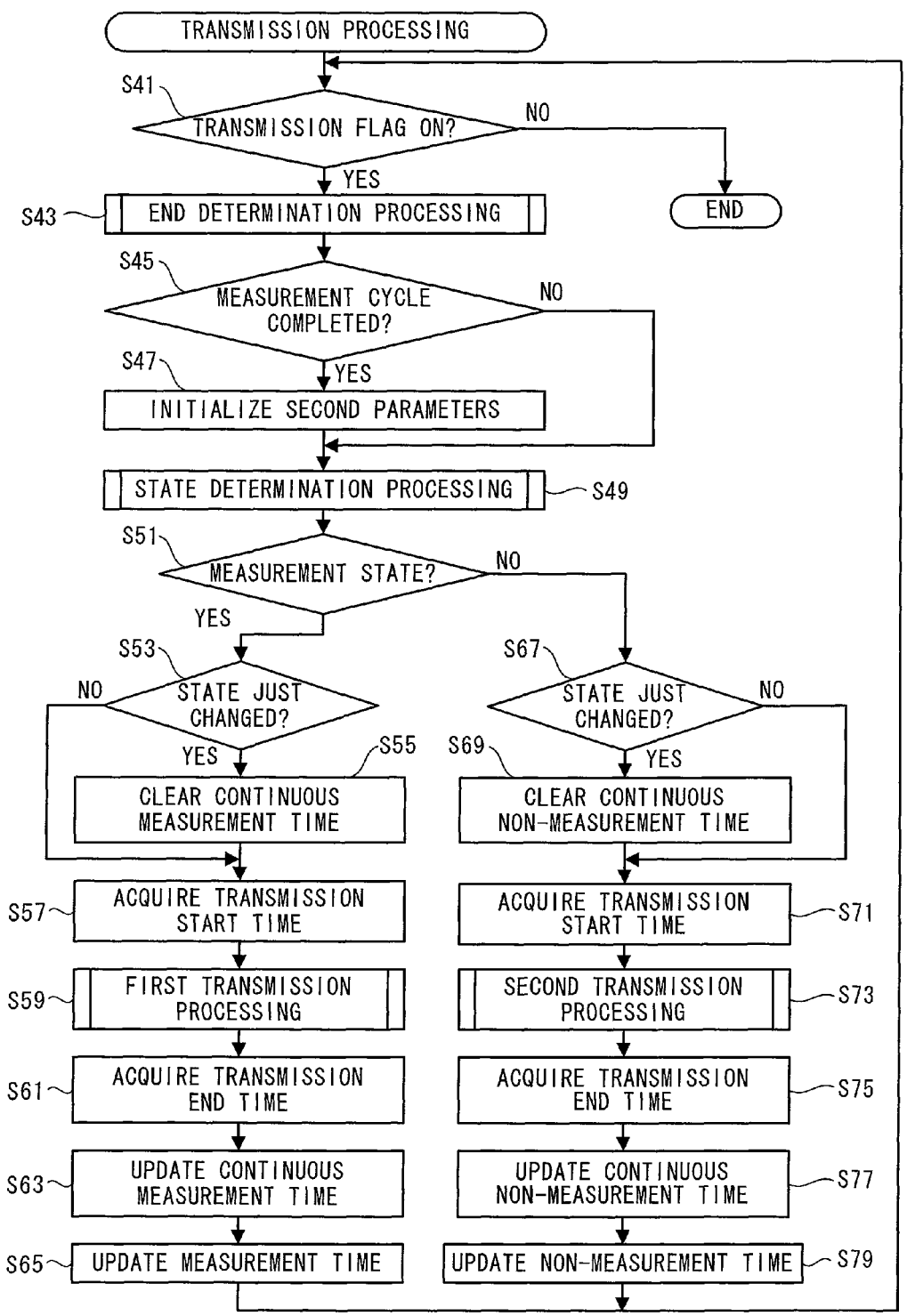
FIG. 6 is a flow chart showing transmission processing.
Figure 7:
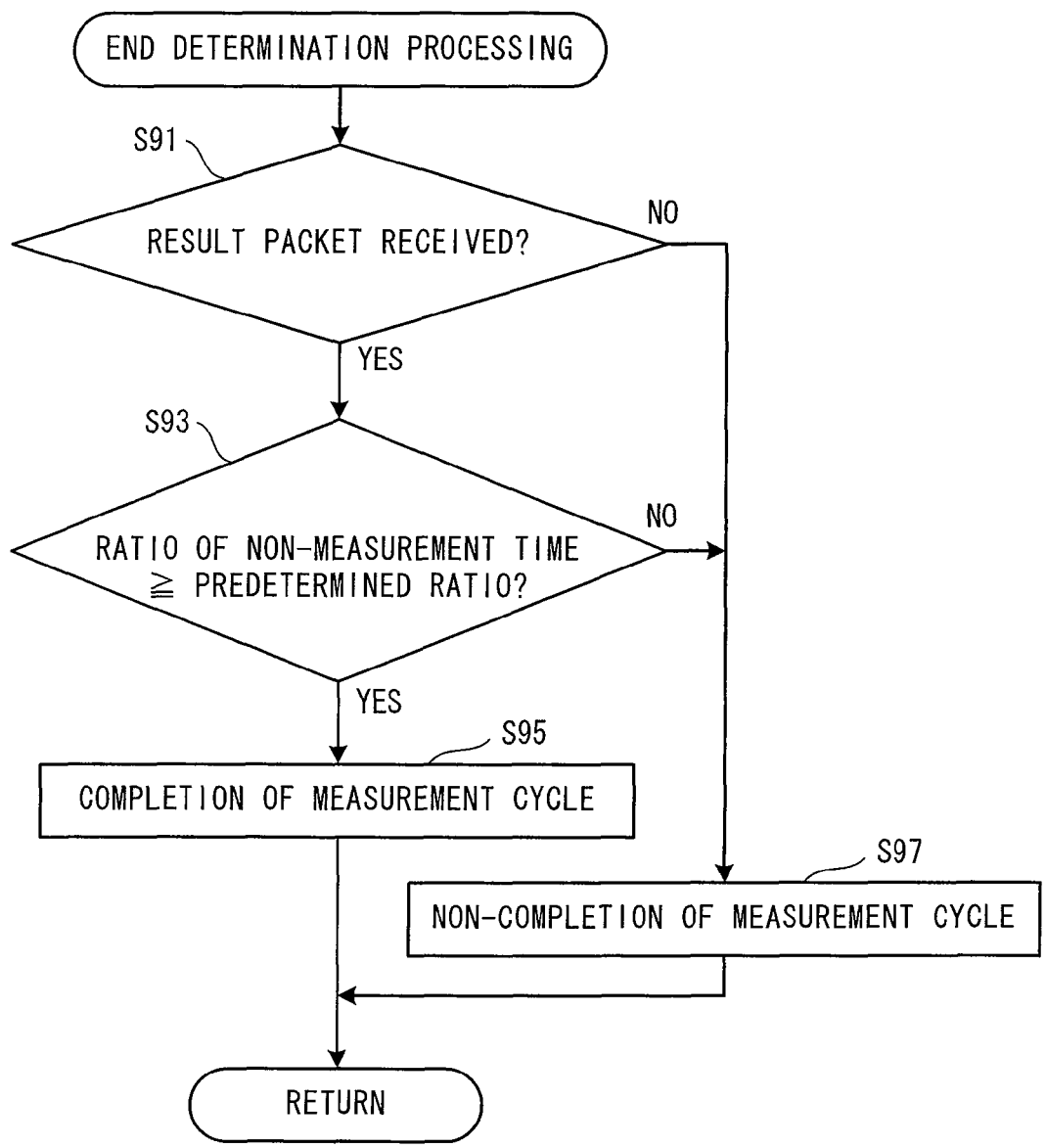
FIG. 7 is a flow chart showing end determination processing.
Figure 8:
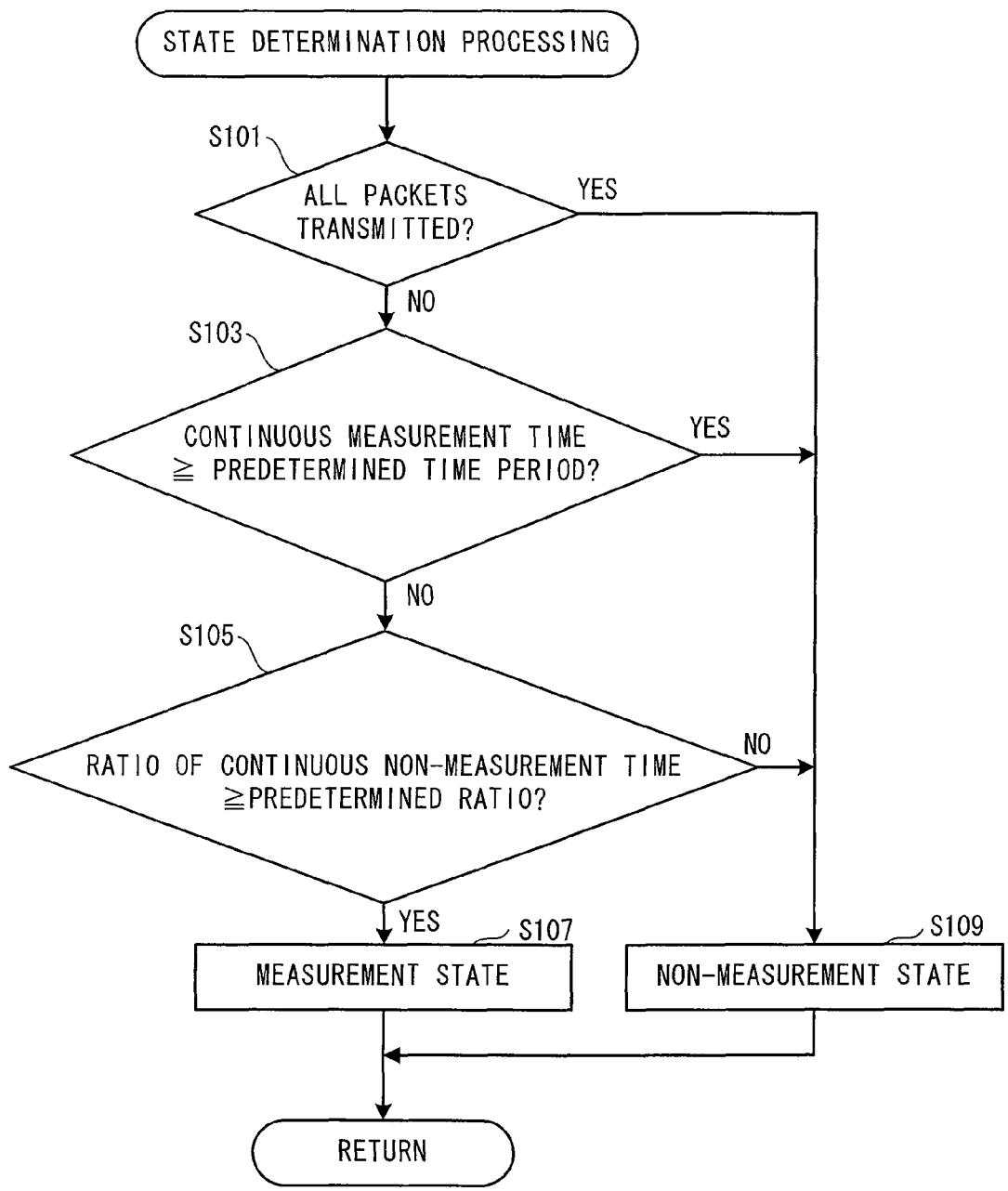
FIG. 8 is a flow chart showing state determination processing.
Figure 9:
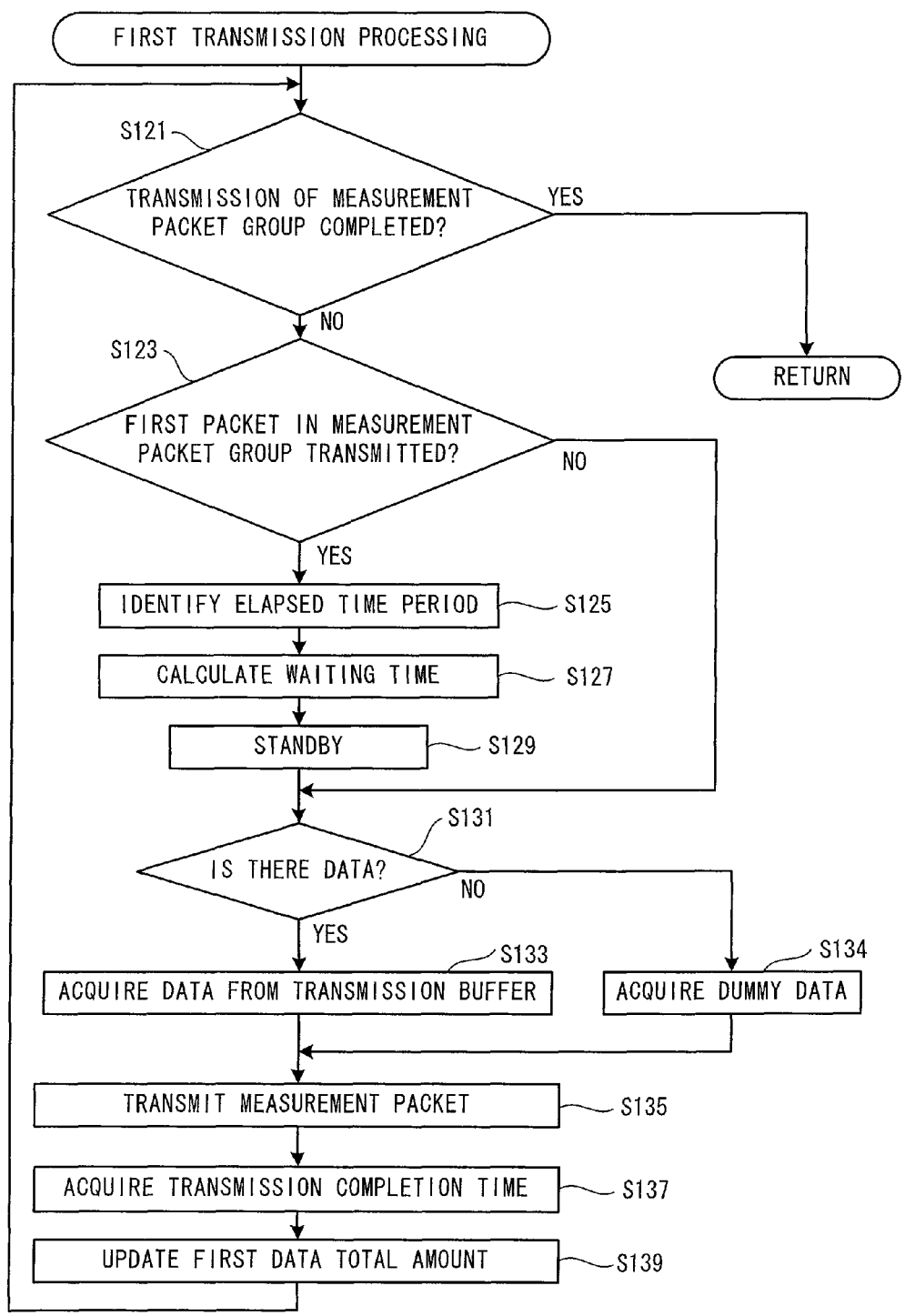
FIG. 9 is a flow chart showing first transmission processing.
Figure 10:
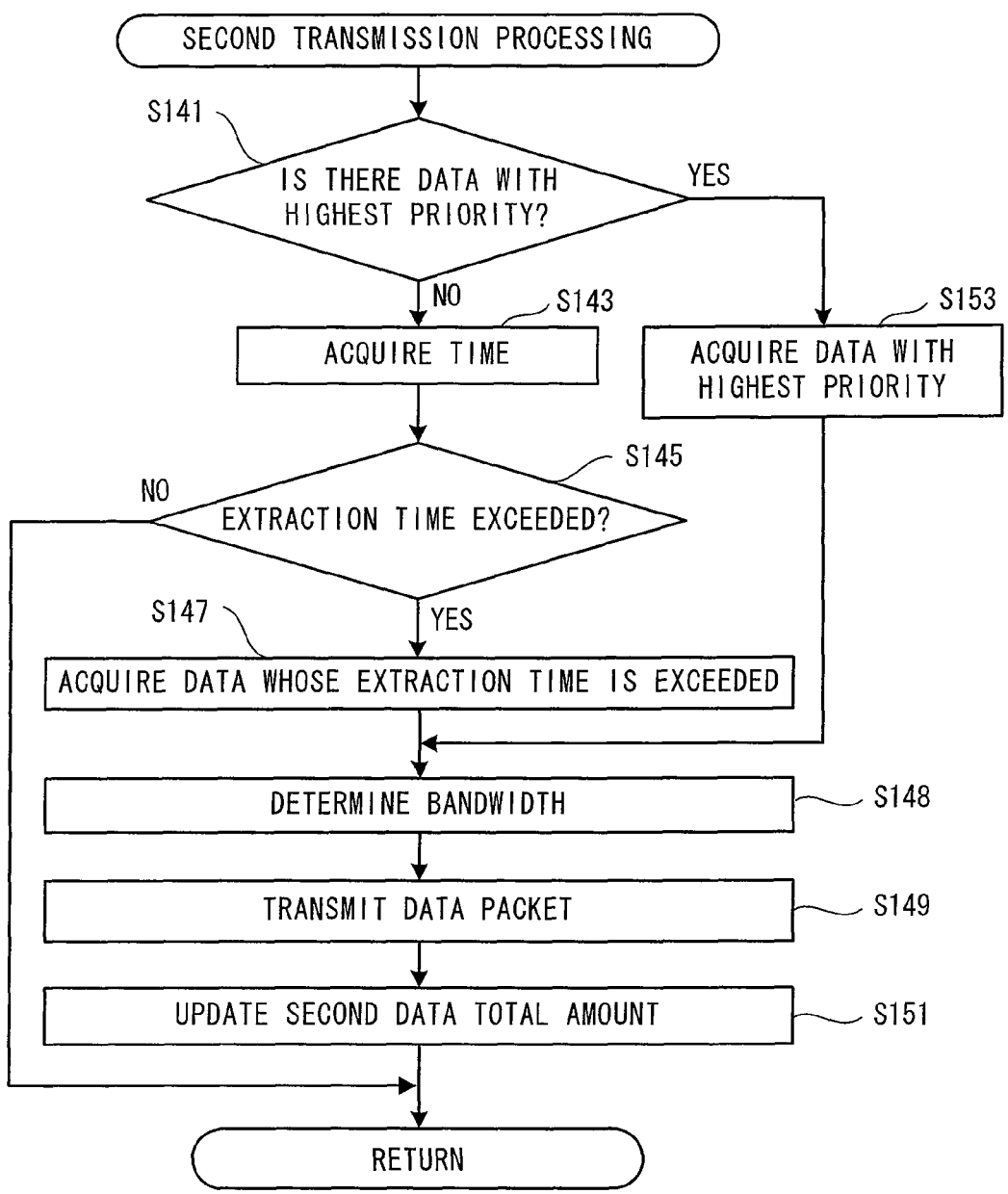
FIG. 10 is a flow chart showing second transmission processing.

As shown in FIG. 6, as a result of the state determination processing (step S49), if it is determined that the operation state is the measurement state (yes at step S51), it is then determined whether the operation state is a state immediately after the switching from the non-measurement state to the measurement state (step S53). The determination at step S53 may be made based on whether the operation state has been switched at step S49. If the operation state has been switched from the non-measurement state to the measurement state at step S49 (yes at step S53), the continuous measurement time is cleared and initialized in order to start transmission of the measurement packets that form the measurement packet group (step S55). After step S55, the processing proceeds to step S57. If the operation state is continuously in the measurement state (no at step S53), the continuous measurement time is not cleared and the processing proceeds to step S57.

A current time (t1) is acquired as a transmission start time (step S57). First transmission processing is performed (step S59). In the first transmission processing, in a case where the first total number is smaller than the second total number, the measurement packets are transmitted in units of the measurement packet groups. The first transmission processing will be described with reference to FIG. 9. It is determined whether the last measurement packet among the measurement packets that form the measurement packet group has been transmitted (step S121). The determination at step S121 may be made by comparing the sequence number assigned to the last transmitted measurement packet with the first total number. If the last measurement packet among the measurement packets that form the measurement packet group has not been transmitted (no at step S121), it means that not all the measurement packets that form the measurement packet group have been transmitted. Next, it is determined whether the first measurement packet among the measurement packets that form the measurement packet group has already been transmitted (step S123). If the first measurement packet among the measurement packets that form the measurement packet group has not yet been transmitted (no at step S123), the processing proceeds to step S131.

If the first measurement packet among the measurement packets that form the measurement packet group has already been transmitted (yes at step S123), an elapsed time period from a time (t2, refer to step S137 to be described later), at which transmission of the measurement packet of the previous time was completed, to the current time is identified (step S125). Based on the identified elapsed time period and the transmission interval, a waiting time to be on standby from the current time to the transmission of the measurement packet is calculated (step S127). The transmission of the measurement packet is kept on standby for the calculated waiting time (step S129).

After the standby at step S129, it is determined whether data that has not been transmitted to the reception device is left in the transmission buffers (step S131). If the untransmitted data is left in the transmission buffers (yes at step S131), one of the transmission buffers is selected according to the priority. The data is acquired from the selected transmission buffer (step S133). On the other hand, if the untransmitted data is not left in the transmission buffers (no at step S131), dummy data is acquired (step S134). The dummy data is data with no content, and is stored in the measurement packet as a matter of form in order to meet the size of the measurement packet. After step S133 or step S134, the processing proceeds to step S135. At step S135, the measurement packet is generated based on the data acquired at step S133 or step S134. A sequence number is assigned to the measurement packet. The generated measurement packet is transmitted to the reception device (step S135). "1" is added to the sequence number and the sequence number is thereby updated. The current time (t2) is acquired as the time at which the transmission is completed (step S137). A total amount of data stored in the measurement packet is added to the first data total amount, and the first data total amount is thereby updated (step S139). After step S139, the processing returns to step S121.

If the above-described processing is repeated and the last measurement packet among the measurement packets that form the measurement packet group has been transmitted to the reception device (yes at step S121), it means that all of the measurement packets that form the measurement packet group have been transmitted. The first transmission processing ends and the processing returns to the transmission processing (refer to FIG. 6). Note that, in a case where the first total number and the second total number have the same value, the series of measurement packets are not divided into a plurality of measurement packet groups. Then, the processing at step S121 may be performed by comparing the sequence number assigned to the last transmitted measurement packet with the first total number. Therefore, in a case where the first total number and the second total number have the same value, it is determined at step S121 whether all of the series of measurement packets have been transmitted. At step S123, it is determined whether the first measurement packet among the measurement packets that form the series of measurement packets has been transmitted.

The communication device 1 in the second example transmits the measurement packets in units of the measurement packet groups, and thereby increases the frequency of the determination of the switching to the non-measurement state. By doing this, the communication device 1 can increase the frequency of the switching to the non-measurement state. The data packets can be frequently transmitted to the reception device. It is therefore possible to reduce the communication delay of data stored in the data packets.

After the first transmission processing (step S59) ends, a current time (t3) is acquired as a transmission end time (step S61). A difference between the transmission start time (t1) acquired at step S57 and the transmission end time (t3) acquired at step S61 is calculated. The calculated difference is added to the continuous measurement time, and the continuous measurement time is thereby updated (step S63). The calculated difference is added to the measurement time, and the measurement time is thereby updated (step S65). After step S65, the processing returns to step S41.

On the other hand, as a result of the state determination processing (step S49), if the operation state is the non-measurement state (no at step S51), it is determined whether the operation state is a state immediately after the switching from the measurement state to the non-measurement state (step S67). If the operation state is the state immediately after the switching from the measurement state to the non-measurement state (yes at step S67), the continuous non-measurement time is cleared and initialized in order to start data packet transmission (step S69). After step S69, the processing proceeds to step S71. If the operation state is continuously in the non-measurement state (no at step S67), the continuous non-measurement time is not cleared and the processing proceeds to step S71.

The current time (t1) is acquired as the transmission start time (step S71). After step S71, second transmission processing is performed (step S73). In the second transmission processing, the data stored in the transmission buffer with the highest priority is acquired by priority, and the acquired data is stored in a data packet and is transmitted. The second transmission processing will be described with reference to FIG. 10. It is determined whether data is stored in the transmission buffer with the highest priority (step S141). If data is stored in the transmission buffer with the highest priority (yes at step S141), the data stored in this transmission buffer is acquired (step S153). After step S153, the processing proceeds to step S148.

On the other hand, if data is not stored in the transmission buffer with the highest priority (no at step S141), a current time is acquired (step S143). The extraction time associated with the data stored in the other transmission buffer is extracted. The extracted extraction time is compared with the current time acquired at step S143. It is determined whether the current time exceeds the extraction time (step S145). If the current time does not exceed the extraction time (no at step S145), it is determined that data to be stored in a data packet is not stored in the transmission buffer. In this case, the second transmission processing ends, and the processing returns to the transmission processing (refer to FIG. 6). On the other hand, if the current time exceeds the extraction time (yes at step S145), the data associated with the corresponding extraction time is acquired from the transmission buffer (step S147). After step S147, the processing proceeds to step S148.

At step S148, a bandwidth that is used when the data packet is transmitted is determined (step S148). A bandwidth that is smaller than the available bandwidth that was measured in the past is determined as the bandwidth to be used. The data packet is generated based on the data acquired at step S147 or step S153. A sequence number is assigned to the data packet. The generated data packet is transmitted to the reception device (step S149). "1" is added to the sequence number and the sequence number is thereby updated. A total amount of data stored in the data packet is added to the second data total amount, and the second data total amount is thereby updated (step S151). After step S151, the second transmission processing ends, and the processing returns to the transmission processing (refer to FIG. 6).

In this manner, the highest priority data can be stored in the data packet by priority. In the present embodiment, audio data requiring real time characteristics is stored in the transmission buffer with the highest priority. Accordingly, the communication device 1 can transmit the audio data to the reception device without delay. Further, if the elapsed time period from the generation of data exceeds a permissible time period, it is possible to store the corresponding data in the data packet and to transmit the stored data. Accordingly, it is possible to inhibit a case in which it takes a long time for the generated data to reach the reception device.

Note that, in the above description, it is assumed that the bandwidth that is used when the data packets are transmitted is a bandwidth that is smaller than the available bandwidth that was measured in the past. However, the bandwidth may be determined using another method. For example, the bandwidth may be determined to be equal to or less than a predetermined ratio of the available bandwidth that was identified in the past. Thus, the communication device 1 can further increase reliability of data packet communication.

In the transmission processing shown in FIG. 6, after the second transmission processing (step S73) ends, the current time (t3) is acquired as the transmission end time (step S75). A difference between the transmission start time (t1) acquired at step S71 and the transmission end time (t3) acquired at step S75 is calculated. The calculated difference is added to the continuous non-measurement time, and the continuous non-measurement time is thereby updated (step S77). The calculated difference is added to the non-measurement time, and the non-measurement time is thereby updated (step S79). After step S79, the processing returns to step S41.

Figure 11:
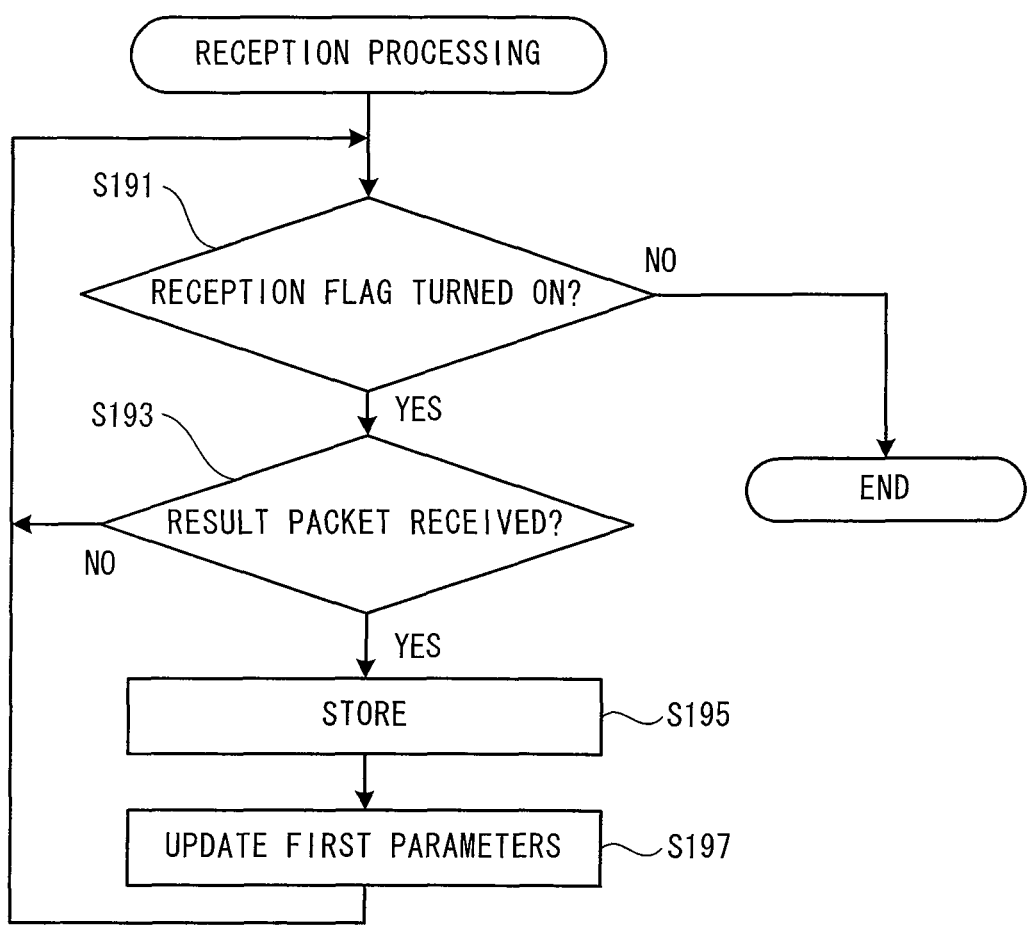
FIG. 11 is a flow chart showing reception processing.

The reception processing will be described with reference to FIG. 11. It is determined whether the reception flag has been switched from ON to OFF (step S191). If the reception flag has been turned OFF in the main processing (no at step S191), the reception processing ends. If the reception flag is turned ON (yes at step S191), it is determined whether the result packet transmitted from the reception device has been received (step S193). If the result packet has not been received (no at step S193), the processing returns to step S191. If the result packet has been received (yes at step S193), the available bandwidth stored in the result packet is acquired. The acquired available bandwidth is stored in the HDD 13 (step S195). The first parameters are updated (step S197) in order to newly determine the bandwidth range and the transmission interval based on the acquired available bandwidth and to perform the measurement communication in the next measurement cycle. After step S197, the processing returns to step S191.

As described above, since the non-measurement state is provided, the communication device 1 can secure a bandwidth that is necessary to perform communication of packets (data packets) other than measurement packets. As a result, with the use of the secured bandwidth, at the same time as measuring the available bandwidth in the network, the communication device 1 can perform other communication. For example, as described above, the communication device 1 can continuously perform communication of data requiring real time characteristics.

The bandwidth that is used when data packet communication is performed is smaller than the available bandwidth that was measured in the past. Accordingly, the communication device 1 can perform the data packet communication by effectively using the bandwidth secured by providing the non-measurement state. Since the data packet communication does not occupy the bandwidth of the network, the communication device 1 can stably perform the data packet communication.

The present disclosure is not limited to the above-described embodiment, and various modifications are possible. In the above-described embodiment, among various types of data (audio data, image data and audio data) generated by the encoder of the transmission device, the audio data with the highest priority is stored in a data packet by priority. However, the data to be stored in the data packet may be data that is used in an application different from the application that measures the bandwidth. Alternatively, for example, communication of other data may be performed by another of the communication devices 1 using the bandwidth secured by providing the non-measurement state.

According to the condition (2) of the above-described embodiment, if the continuous measurement time is equal to or more than the predetermined time period, the operation state of the communication device 1 is switched from the measurement state to the non-measurement state. However, the operation state of the communication device 1 may be switched from the measurement state to the non-measurement state if the continuous measurement time is equal to or more than a predetermined ratio of the measurement cycle. Alternatively, a transmission time period over which one measurement packet group is transmitted may be determined. If the continuous measurement time is equal to or more than a predetermined ratio of the transmission time period, the operation state of the communication device 1 may be switched from the measurement state to the non-measurement state.

According to the condition (3) of the above-described embodiment, the operation state of the communication device 1 is switched from the non-measurement state to the measurement state, in accordance with the time ratio between the continuous measurement time and the continuous non-measurement time. However, the operation state of the communication device 1 may be switched from the non-measurement state to the measurement state if the continuous non-measurement time is equal to or more than a predetermined time period.

In the above description, the measurement packet group includes a predetermined number of measurement packets. However, as long as measurement packets that are necessary to measure the available bandwidth within a predetermined bandwidth range are included, the number of the included measurement packets needs not necessarily be the predetermined number.

In the above-described embodiment, the operation state is switched based on the above-described conditions (1) to (3). Next, a modified embodiment of the present disclosure will be described.

In the modified embodiment, the operation state is switched from the measurement state to the non-measurement state if a predetermined relationship is satisfied between the identified available bandwidth and an average of the bandwidth (hereinafter referred to as an "average bandwidth") that is occupied when packets (measurement packets and data packets) are transmitted within a measurement cycle. For example, the operation state may be switched to the non-measurement state if a value obtained by adding a predetermined bandwidth to the average bandwidth is larger than the available bandwidth. The predetermined bandwidth corresponds to the bandwidth secured by providing the non-measurement state. Accordingly, the communication device 1 can secure a desired vacant bandwidth. Therefore, the communication device 1 can reliably transmit a desired amount of data to the reception device, using the secured vacant bandwidth.

State determination processing according to the modified embodiment will be described with reference to FIG. 12. Main processing, transmission processing (except the state determination processing) and reception processing according to the modified embodiment are the same as those of the above-described embodiment. The state determination processing according to the modified embodiment is called from the transmission processing (refer to FIG. 6).

When the state determination process is called, first, it is determined whether all of the series of measurement packets that measure the bandwidth range have been transmitted (step S201). If all of the series of measurement packets have been transmitted (yes at step S201), it is determined that the operation state is the non-measurement state (step S213). The state determination processing ends and the processing returns to the transmission processing (refer to FIG. 6).

If not all of the series of measurement packets have been transmitted (no at step S201), the first data total amount is acquired (step S203). Next, the second data total amount is acquired (step S205). A value obtained by adding the first data total amount and the second data total amount is divided by the measurement cycle. Thus, the average bandwidth is calculated (step S207). A calculation formula is as follows.

$$\text{Average bandwidth} = (\text{first data total amount} + \text{second data total amount})(\text{bit})/\text{measurement cycle(s)}$$

Next, the available bandwidth stored in the HDD 13 is acquired. The available bandwidth is identified in the reception processing (refer to FIG. 11). It is determined whether a value obtained by adding a predetermined bandwidth to the average bandwidth calculated at step S207 is larger than the available bandwidth (step S209). If the value obtained by adding the predetermined bandwidth to the average bandwidth is larger than the available bandwidth (yes at step S209), it is determined that the operation state is the non-measurement state (step S213). As a result of switching to the non-measurement state, the bandwidth for data packets can be secured. After the switching to the non-measurement state, the state determination processing ends, and the processing returns to the transmission processing (refer to FIG. 6). On the other hand, if the value obtained by adding the predetermined bandwidth to the average bandwidth is equal to or smaller than the available bandwidth (no at step S209), it is determined that the operation state is the measurement state (step S211) because transmission of measurement packets can be continued. The state determination processing ends and the processing returns to the transmission processing (refer to FIG. 6).

As described above, the communication device 1 switches the operation state to the non-measurement state if the predetermined relationship is satisfied between the available bandwidth and the average bandwidth, thus securing the predetermined bandwidth. As a result of this, the communication device 1 can secure a desired bandwidth while reliably performing communication of measurement packets and data packets.

The apparatus and methods described above with reference to the various embodiments are merely examples. It goes without saying that they are not confined to the depicted embodiments. While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A communication device configured to be connected to a network, comprising:
    a switching portion that switches an operation state of the communication device between a measurement state and a non-measurement state within a predetermined cycle, the measurement state being a state in which an available bandwidth is measured, the non-measurement state being a state in which the available bandwidth is not measured, and the available bandwidth being a bandwidth available in the network;
    a first transmission portion that transmits to a partner device a plurality of measurement packets while sequentially changing transmission intervals, in a state in which the operation state has been switched to the measurement state by the switching portion, the partner device being another communication device that is connected to the network;
    a second transmission portion that transmits a data packet to the partner device, using a bandwidth smaller than the available bandwidth, in a state in which the operation state has been switched to the non-measurement state by the switching portion; and
    a calculation portion that calculates an average bandwidth based on a data amount of the plurality of measurement packets that have been transmitted by the first transmission portion and on a data amount of the data packet that has been transmitted by the second transmission portion, the average bandwidth being an average of bandwidths used within the predetermined cycle,
    wherein the switching portion switches the operation state from the measurement state to the non-measurement state if a predetermined relationship is satisfied between the average bandwidth calculated by the calculation portion and the available bandwidth.

2. The communication device according to claim 1, wherein
    the switching portion switches the operation state from the measurement state to the non-measurement state if the measurement state has been continued for at least a predetermined time period.

3. The communication device according to claim 1, wherein
    the switching portion switches the operation state from the non-measurement state to the measurement state if a ratio of a time period during which the non-measurement state has been continued with respect to a time period during which the measurement state has been continued is equal to or more than a predetermined ratio.

4. The communication device according to claim 1, wherein
    the first transmission portion divides the plurality of measurement packets into a plurality of measurement packet groups and transmits the plurality of measurement packets in units of the measurement packet groups, each of the plurality of measurement packet groups including at least one measurement packet, and
    the switching portion determines, when transmission of one of the measurement packet groups is completed, whether to switch the operation state from the measurement state to the non-measurement state, and if the switching portion determines that the operation state is to be switched, the switching portion switches the operation state from the measurement state to the non-measurement state.

5. The communication device according to claim 4, wherein
    the first transmission portion divides the plurality of measurement packets into each group of a first total number and transmits the plurality of measurement packets in units of the measurement packet groups, the first total number being smaller than a second total number, and the second total number being a total number of the plurality of measurement packets to be transmitted within the predetermined cycle.

6. The communication device according to claim 1, wherein
    the second transmission portion transmits the data packet using a bandwidth that is equal to or less than a predetermined ratio of the available bandwidth.

7. The communication device according to claim 1, further comprising:
    an identification portion that identifies a priority of data to be stored in the measurement packet or the data packet,
    wherein the second transmission portion stores by priority, in the data packet, the data which is identified as high priority by the identification portion, and transmits the data packet to the partner device.

8. The communication device according to claim 1, wherein
    the second transmission portion stores by priority, in the data packet, data for which an elapsed time period from generation of the data to be stored in the data packet is equal to or more than a predetermined time period, and transmits the data packet to the partner device.

9. A non-transitory computer-readable medium having instructions stored thereon for causing a processor of a communication device configured to be connected to a network to execute the steps of:
    switching an operation state of the communication device between a measurement state and a non-measurement state within a predetermined cycle, the measurement state being a state in which an available bandwidth is measured, the non-measurement state being a state in which the available bandwidth is not measured, and the available bandwidth being a bandwidth available in the network;
    transmitting to a partner device a plurality of measurement packets while sequentially changing transmission intervals, in a state in which the operation state has been switched to the measurement state, the partner device being another communication device that is connected to the network;
    transmitting a data packet to the partner device, using a bandwidth smaller than the available bandwidth, in a state in which the operation state has been switched to the non-measurement state; and
    calculating an average bandwidth based on a data amount of the plurality of measurement packets that have been transmitted and on a data amount of the data packet that has been transmitted, the average bandwidth being an average of bandwidths used within the predetermined cycle, wherein the operation state is switched from the measurement state to the non-measurement state if a predetermined relationship is satisfied between the calculated average bandwidth and the available bandwidth.

10. The non-transitory computer-readable medium according to claim 9, wherein
the operation state is switched from the measurement state to the non-measurement state if the measurement state has been continued for at least a predetermined time period.

11. The non-transitory computer-readable medium according to claim 9, wherein
the operation state is switched from the non-measurement state to the measurement state if a ratio of a time period during which the non-measurement state has been continued with respect to a time period during which the measurement state has been continued is equal to or more than a predetermined ratio.

12. The non-transitory computer-readable medium according to claim 9, wherein
the plurality of measurement packets are divided into a plurality of measurement packet groups, and are transmitted in units of the measurement packet groups, each of the plurality of measurement packet groups including at least one measurement packet, and
when transmission of one of the measurement packet groups is completed, it is determined whether to switch the operation state from the measurement state to the non-measurement state, and if it is determined that the operation state is to be switched, the operation state is switched from the measurement state to the non-measurement state.

13. The non-transitory computer-readable medium according to claim 12, wherein
the plurality of measurement packets are divided into each group of a first total number and are transmitted in units of the measurement packet groups, the first total number being smaller than a second total number, and the second total number being a total number of the plurality of measurement packets to be transmitted within the predetermined cycle.

14. The non-transitory computer-readable medium according to claim 9, wherein
the data packet is transmitted using a bandwidth that is equal to or less than a predetermined ratio of the available bandwidth.

15. The non-transitory computer-readable medium according to claim 9, having further instructions stored thereon that cause the processor to perform the step of:

identifying a priority of data to be stored in the measurement packet or the data packet,
wherein the data which is identified as high priority is stored by priority in the data packet, and is transmitted to the partner device.

16. The non-transitory computer-readable medium according to claim 9, wherein
data, for which an elapsed time period from generation of the data to be stored in the data packet is equal to or more than a predetermined time period, is stored by priority in the data packet, and is transmitted to the partner device.

17. A non-transitory computer-readable medium instructions stored thereon for causing a processor of a communication device configured to be connected to a network to execute the steps of:

switching an operation state of the communication device between a measurement state and a non-measurement state within a predetermined cycle, the measurement state being a state in which an available bandwidth is measured, the non-measurement state being a state in which the available bandwidth is not measured, and the available bandwidth being a bandwidth available in the network;

transmitting to a partner device a plurality of measurement packets while sequentially changing transmission intervals, in a state in which the operation state has been switched to the measurement state, the partner device being another communication device that is connected to the network; and transmitting a data packet to the partner device, using a bandwidth smaller than the available bandwidth, in a state in which the operation state has been switched to the non-measurement state, wherein the plurality of measurement packets are divided into a plurality of measurement packet groups, and are transmitted in units of the measurement packet groups, each of the plurality of measurement packet groups including at least one measurement packet; and when transmission of one of the measurement packet groups is completed, it is determined whether to switch the operation state from the measurement state to the non-measurement state, and if it is determined that the operation state is to be switched, the operation state is switched from the measurement state to the non-measurement state.

* * * * *